(12) United States Patent
Choi et al.

(10) Patent No.: US 10,135,092 B2
(45) Date of Patent: Nov. 20, 2018

(54) POLYMER ELECTROLYTE, LITHIUM SECONDARY BATTERY USING SAME, AND METHOD FOR MANUFACTURING LITHIUM SECONDARY BATTERY

(71) Applicant: AMOGREENTECH CO., LTD., Gimpo-si (KR)

(72) Inventors: Won Gil Choi, Gunpo-si (KR); Ju Hee Jang, Uijeongbu-si (KR); Seung Yun Rho, Hwaseong-si (KR); In Yong Seo, Seoul (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 419 days.

(21) Appl. No.: 14/797,431

(22) Filed: Jul. 13, 2015

(65) Prior Publication Data

US 2015/0318570 A1 Nov. 5, 2015

Related U.S. Application Data

(62) Division of application No. PCT/KR2014/000417, filed on Jan. 15, 2014.

(30) Foreign Application Priority Data

| Jan. 15, 2013 | (KR) | 10-2013-0004590 |
| Jul. 12, 2013 | (KR) | 10-2013-0082008 |
| Oct. 31, 2013 | (KR) | 10-2013-0131035 |

(51) Int. Cl.
*H01M 2/16* (2006.01)
*H01M 2/14* (2006.01)
(Continued)

(52) U.S. Cl.
CPC ........ *H01M 10/0565* (2013.01); *H01B 1/122* (2013.01); *H01M 2/145* (2013.01);
(Continued)

(58) Field of Classification Search
CPC .......... H01M 10/052; H01M 10/0525; H01M 10/0565; H01M 2/145; H01M 2/1686
See application file for complete search history.

(56) References Cited

U.S. PATENT DOCUMENTS

| 6,180,281 B1 * | 1/2001 | Schneider | ............. | H01M 2/162 |
| | | | | 429/129 |
| 2002/0142214 A1 * | 10/2002 | Pekala | ................ | H01M 2/1673 |
| | | | | 429/144 |

(Continued)

FOREIGN PATENT DOCUMENTS

| KR | 1020040084117 | 10/2004 |
| KR | 1020060001743 | 1/2006 |

(Continued)

OTHER PUBLICATIONS

International Search Report—PCT/KR2014/000417 dated Apr. 16, 2014.

*Primary Examiner* — Kenneth J Douyette
(74) *Attorney, Agent, or Firm* — Cantor Colburn LLP

(57) ABSTRACT

Provided are a polymer electrolyte, a lithium secondary battery using the same, and a manufacturing method thereof, in which a gel polymer electrolyte is formed from a monomer for forming a gel polymer by a rapid polymerization reaction, when using a porous nanofiber web as an electrolyte matrix, and injecting an organic electrolytic solution formed by mixing the gel polymer forming monomer and a polymerization initiator, to induce an addition polymerization reaction, but the porous nanofiber web maintains a web-like shape. The polymer electrolyte includes: a separator made of a porous nanofiber web having a plurality of nanofibers; and a gel polymer portion impregnated in the porous nanofiber web. the gel polymer portion is formed by impregnating an electrolytic solution containing a non-aqueous organic solvent, a lithium salt solute, a gel polymer (Continued)

forming monomer, and a polymerization initiator in the porous nanofiber web and polymerizing the gel polymer forming monomer.

7 Claims, 8 Drawing Sheets

(51) Int. Cl.
  *H01M 10/0565* (2010.01)
  *H01M 10/0525* (2010.01)
  *H01B 1/12* (2006.01)
  *H01M 10/052* (2010.01)

(52) U.S. Cl.
  CPC ........ *H01M 10/0525* (2013.01); *H01M 2/162* (2013.01); *H01M 2/1686* (2013.01); *H01M 10/052* (2013.01); *H01M 2300/0085* (2013.01)

(56) References Cited

U.S. PATENT DOCUMENTS

| | | | | |
|---|---|---|---|---|
| 2005/0118508 A1* | 6/2005 | Yong | ............... | H01M 2/1673 429/246 |
| 2005/0234177 A1* | 10/2005 | Zaghib | ............... | C08F 283/00 524/435 |
| 2006/0246354 A1* | 11/2006 | Lee | ............... | H01M 4/0404 429/246 |
| 2007/0042266 A1* | 2/2007 | Oh | ............... | C08K 5/0008 429/188 |
| 2007/0054184 A1* | 3/2007 | Yong | ............... | H01M 2/145 429/144 |
| 2008/0063942 A1* | 3/2008 | Okuno | ............... | H01M 4/667 429/232 |
| 2010/0196766 A1* | 8/2010 | Park | ............... | H01M 4/0445 429/338 |
| 2010/0304205 A1* | 12/2010 | Jo | ............... | H01G 9/02 429/144 |
| 2011/0136000 A1* | 6/2011 | Moon | ............... | H01M 2/0285 429/163 |
| 2011/0206974 A1* | 8/2011 | Inoue | ............... | H01M 4/043 429/149 |
| 2011/0294007 A1* | 12/2011 | Hosaka | ............... | H01M 2/08 429/210 |
| 2013/0236766 A1* | 9/2013 | Seo | ............... | H01M 2/145 429/144 |

FOREIGN PATENT DOCUMENTS

| | | | |
|---|---|---|---|
| KR | 1020090012726 | 2/2009 | |
| KR | 1020090035328 | 4/2009 | |
| KR | 1020100016919 | 2/2010 | |
| KR | 1020110137567 | 12/2011 | |
| WO | WO-2012/060604 A1 * | 5/2012 | ............ H01M 2/145 |

* cited by examiner

POLYMER ELECTROLYTE, LITHIUM SECONDARY BATTERY USING SAME, AND METHOD FOR MANUFACTURING LITHIUM SECONDARY BATTERY

CROSS REFERENCE TO RELATED APPLICATIONS

This application is a divisional of International Application No. PCT/KR2014/000417, filed on Jan. 15, 2014, which claims priority to and the benefit of Korean Application Nos. 10-2013-0004590 filed on Jan. 15, 2013; 10-2013-0082008 filed on Jul. 12, 2013; and 10-2013-0131035 filed on Oct. 31, 2013, in the Korean Patent Office, the entire contents of which are incorporated herein by reference.

TECHNICAL FIELD

The present invention relates to a polymer electrolyte, a lithium secondary battery using the same and a manufacturing method thereof. More particularly, the present invention relates to a polymer electrolyte in which a gel polymer electrolyte is configured by a polymerization reaction of a monomer for forming a gel polymer that is impregnated into a porous nanofiber web, and a short circuit between a positive electrode and a negative electrode can be prevented by the porous nanofiber web, a lithium secondary battery using the polymer electrolyte and a manufacturing method thereof.

BACKGROUND ART

Conventionally, an electrolyte that is formed by impregnating a non-aqueous electrolytic solution into a film having pores in which the film is referred to as a separator has been generally used as an electrolyte of a lithium secondary battery. In recent years, a lithium secondary battery (such as a polymer battery) using a polymer electrolyte made of a polymer other than such a liquid-phase electrolyte has attracted attention.

The polymer battery uses an electrolyte in gel form in which a liquid electrolytic solution has been impregnated in the polymer. Since the liquid electrolytic solution is retained in the polymer, it is difficult for the liquid electrolytic solution to leak out. Therefore, the polymer battery has the advantages that the safety of the battery is enhanced, and also the contour of the cell may be formed freely.

The polymer electrolyte has the low conductivity of the lithium ions when being compared with the electrolyte composed of only the liquid electrolytic solution. Thus, due to the low conductivity of the lithium ions, a method for reducing the thickness of the polymer electrolyte is being used. However, when the polymer electrolyte is reduced to be thin in this way, the mechanical strength of the polymer electrolyte is reduced, the positive electrode and the negative electrode are short-circuited at the time of manufacture of the battery, to thus cause a problem of easily destroying the polymer electrolyte.

Korean Patent Application Publication No. 10-2006-1743 proposed a lithium secondary battery comprising a positive electrode, a negative electrode, and an electrolyte to allow reversible intercalation/de-intercalation of lithium, in which the electrolyte comprises a non-aqueous organic solvent containing a lactone compound having a cyclic carbonate and an alkyl substituent, a lithium salt and a gel-forming compound.

However, since the secondary battery has a structure that the positive electrode and the negative electrode are separated by a gel-type electrolyte, the ionic conductivity of the electrolyte falls in the case of forming a thick film as the electrolyte, and a short circuit occurs between the positive electrode and the negative electrode in the case of forming a thin film as the electrolyte.

Korean Patent Application Publication No. 10-2004-84117 proposed a method of manufacturing a lithium ion polymer battery in which a gel polymer electrolyte is prepared by comprising: stacking a positive electrode, a separator, and a negative electrode in sequence, to thereby being inserted into an aluminum laminate film; injecting a precursor that is formed of a mixture of a liquid electrolyte, a polymerized polymer, a reactive monomer or a macromonomer, a polymerization initiator, and the others, to then perform vacuum sealing; and performing polymerization by maintaining for up to one hour and 30 minutes in a constant temperature chamber of 60° C. ~80° C.

The method of manufacturing the lithium ion polymer battery is characterized in that IPN (Interpenetrating Polymer Network) or HDDA (hexanedioldiacrylate), and a reactive modifier are added in the precursor to thus change a composition ratio thereof to thereby change the physical properties of the gel polymer electrolyte, in which the IPN or HDDA is formed by using one or more acrylate monomers that can react with a polymer having a polymerized acrylate radicle, and the reactive modifier is formed by using at least one acrylate having two or more reaction radicles such as triethyleneglycoldimehtacrylate or tetraethyleneglycoldiacrylate.

The method of manufacturing the lithium ion polymer battery employs a nonwoven fabric separator made of PE (polyethylene) or PP (polypropylene), to thus allow a low porosity and a thick coating layer, to thereby deteriorate ion conductivity.

SUMMARY OF THE INVENTION

The inventors have found that a gel polymer electrolyte is formed by a rapid polymerization reaction of a monomer for forming a gel polymer, when forming an electrode assembly by using a porous nanofiber web made of nanofibers as an electrolyte matrix, and then injecting an organic electrolytic solution that is formed by mixing the gel polymer forming monomer and a polymerization initiator, to then induce an addition polymerization reaction, but the porous nanofiber web maintains a web-like shape as it is. The present invention was made based on this discovery.

To solve the above problems or defects of the conventional art, it is an object of the present invention to provide a polymer electrolyte in which a gel polymer electrolyte is configured by a polymerization reaction of a monomer for forming a gel polymer that is impregnated into a porous nanofiber web, and a short circuit between a positive electrode and a negative electrode can be prevented by the porous nanofiber web, a lithium secondary battery using the polymer electrolyte, and a manufacturing method thereof.

It is another object of the present invention to provide a polymer electrolyte which can ensure a quick and uniform impregnation of an organic electrolytic solution by using a porous nanofiber web made of nanofibers as an electrolyte matrix, a lithium secondary battery using the polymer electrolyte, and a manufacturing method thereof.

It is still another object of the present invention to provide a polymer electrolyte in which a gel polymer electrolyte is configured by a polymerization reaction of a monomer for forming a gel polymer that is impregnated into a porous nanofiber web, to thereby be converted into a solid-phase electrolyte where a liquid-phase electrolytic solution is almost non-existent, to thus prevent leakage of the polymer electrolyte and to accordingly increase an ionic conductivity with stability and thinning, a lithium secondary battery using the polymer electrolyte, and a manufacturing method thereof.

To accomplish the above and other objects of the present invention, according to an aspect of the present invention, there is provided a polymer electrolyte comprising: a separator made of a first porous nanofiber web having a plurality of nanofibers; and a gel polymer portion impregnated in the first porous nanofiber web, wherein the gel polymer portion is formed by a polymerization reaction of a gel polymer forming monomer, from an electrolytic solution that is impregnated into in the first porous nanofiber web and comprising an organic solvent, a lithium salt solute, the gel polymer forming monomer, and a polymerization initiator.

According to another aspect of the present invention, there is provided a lithium secondary battery comprising: a positive electrode and a negative electrode that allow occlusion and release of lithium; and a polymer electrolyte disposed between the positive electrode and the negative electrode, wherein the polymer electrolyte comprises: a porous separator having a plurality of nanofibers; and a gel polymer portion impregnated in the porous separator, wherein the gel polymer portion is formed by a polymerization reaction of a gel polymer forming monomer, from an electrolytic solution that is impregnated into in the porous separator and comprising an organic solvent, a lithium salt solute, the gel polymer forming monomer, and a polymerization initiator.

According to still another aspect of the present invention, there is provided a method of manufacturing a lithium secondary battery, the method comprising the steps of: forming a spinning solution by dissolving a single polymer or a mixed polymer in a solvent; forming a porous separator having a plurality of nanofibers by spinning the spinning solution; forming an electrode assembly by inserting the porous separator between a positive electrode and a negative electrode respectively having a plurality of first and second unit electrode cells; injecting an organic electrolytic solution including at least a monomer and a polymerization initiator after incorporating the electrode assembly in a case; and forming a gel polymer electrolyte by performing a polymerization reaction of a gel polymer forming monomer through a gelling heat treatment for making into a gel, wherein the porous separator maintains a web-like shape.

According to yet another aspect of the present invention, there is provided a method of manufacturing a lithium secondary battery, the method comprising the steps of: forming an electrode assembly by separating and alternately stacking a plurality of unit positive electrode cells and a plurality of unit negative electrode cells by using a pair of porous separators respectively having a plurality of nanofibers; taping the electrode assembly with a compression band; injecting an organic electrolyte including at least a monomer and a polymerization initiator after incorporating the electrode assembly in a case; and forming a gel polymer electrolyte by performing a polymerization reaction of a gel polymer forming monomer through a gelling heat treatment for making into a gel.

According to still yet another aspect of the present invention, there is provided a lithium secondary battery comprising: an electrode assembly in which a plurality of unit positive electrode cells and a plurality of unit negative electrode cells are separated and are alternately stacked by using a pair of porous separators; a compression band for taping an outer circumference of the electrode assembly; a case in which the electrode assembly taped with the compression band is contained; and a polymer electrolyte disposed between each unit positive electrode cell and each unit negative electrode cell, wherein the polymer electrolyte comprises: the porous separators; and a gel polymer portion impregnated in the porous separator, wherein the gel polymer portion is formed by a polymerization reaction of a gel polymer forming monomer, from an electrolytic solution that is impregnated into in the porous separators and comprising an organic solvent, a lithium salt solute, the gel polymer forming monomer, and a polymerization initiator.

As described above, according to the present invention, a gel polymer electrolyte is formed by a polymerization reaction of a monomer for forming a gel polymer, when forming an electrode assembly by using a porous separator as an electrolyte matrix, and then injecting an organic electrolytic solution that is formed by mixing the gel polymer forming monomer and a polymerization initiator, to then induce an addition polymerization reaction, but the porous nanofiber web maintains a web-like shape as it is, to thereby prevent short-circuiting between positive and negative electrodes and thus promote a stability, in which the porous separator is made of any one of a porous nanofiber web, a laminate of a porous nanofiber web and a pore-free film, a laminate of a porous nanofiber web and a porous nonwoven fabric, and a laminate of a porous nonwoven fabric and a pore-free film.

Further, according to the present invention, a porous nanofiber web made of nanofibers is used as an electrolyte matrix to thereby achieve a high porosity, to thus ensure a quick and uniform impregnation of an organic electrolytic solution, and to thereby enable a polymer electrolyte to be thin, to thus increase an ionic conductivity between a positive electrode and a negative electrode and obtain an excellent mechanical property.

In addition, according to the present invention, a segregation phenomenon between an electrolyte and an electrode is prevented by using a polymer electrolyte having an excellent adhesion with the electrode, to thereby suppress an increase in an interface resistance to thus minimize a reduction in an open circuit voltage (OCV).

Furthermore, in the present invention, part of the polymer electrolyte is charged for the positive electrode and the negative electrode, to thereby bond the positive electrode and the negative electrode to the polymer electrolyte, and to thus minimize a reduction in the open circuit voltage (OCV).

In addition, according to the present invention, a non-swellable porous thin-film sheet is wound on an external portion of an electrode assembly, to thereby suppress a phenomenon that expansion and contraction of the electrode assembly occurs during charging and discharging processes, to thus prevent a segregation phenomenon between an electrolyte and an electrode, and to thereby suppress an increase in an interface resistance.

Further, in the present invention, a void ratio (that is, a porosity) is lowered by using a porous separator that is formed by adding a thin film pore-free film or a porous nanofiber web on one side of a porous nonwoven fabric used as a support, to thereby suppress degradation of the open circuit voltage (OCV).

DETAILED DESCRIPTION OF THE INVENTION

The foregoing objects, features and advantages will become further obvious through the following detailed description which will be described in detail with reference to the attached drawings, whereby one who has an ordinary skill in the art will readily carry out the invention.

In addition, a detailed description of the present invention will be omitted if it is determined that a specific description of the known art to which the present invention belongs may unnecessarily obscure the subject matter of the present invention.

Hereinafter, a polymer electrolyte according to an exemplary embodiment of the present specification means a pore-free gel-type polymer electrolyte that is configured by: assembling a porous nanofiber web (that is, an electrolyte matrix) that is a porous separator in an inside of a case together with a positive electrode and a negative electrode; injecting an organic electrolytic solution that is formed by mixing a gel polymer forming monomer and a polymerization initiator; carrying out a gelling process in a state where the organic electrolytic solution is impregnated in the porous nanofiber web to thereby synthesize a gel-type gel polymer by polymerization of the monomer.

Figure 1:
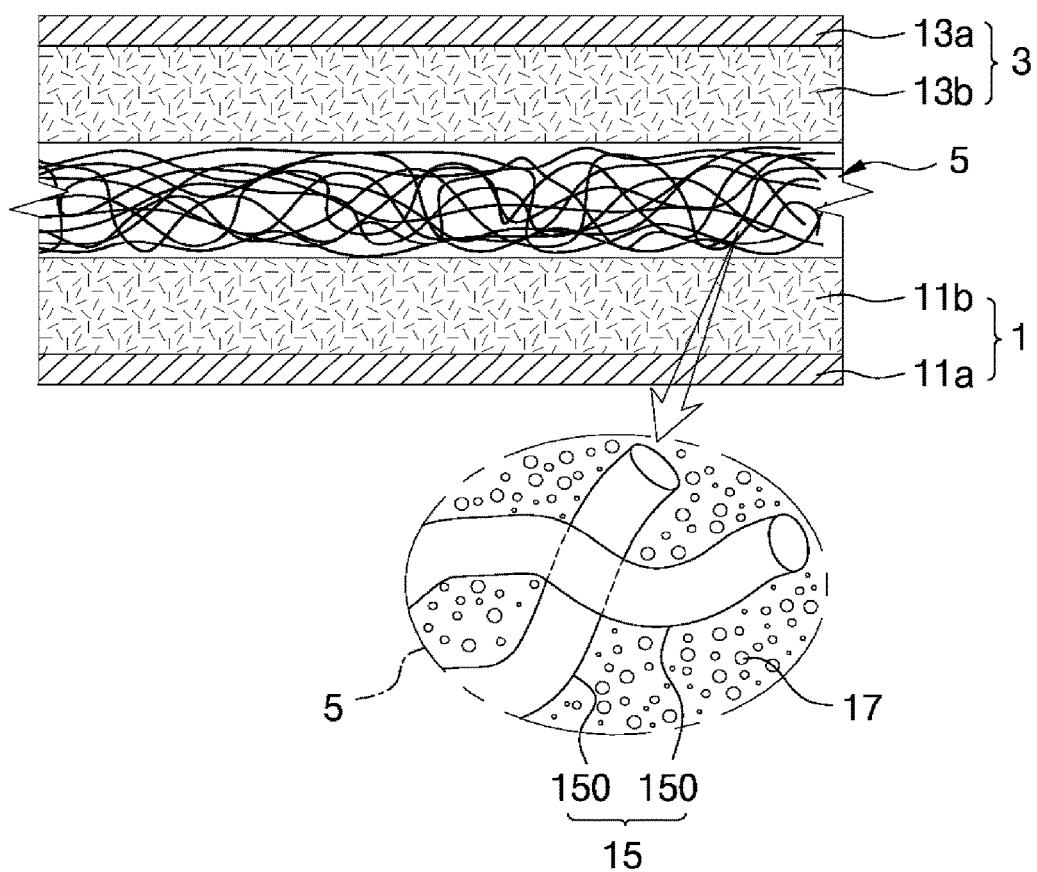
FIG. 1 is a cross-sectional view of a lithium secondary battery according to a first preferred embodiment of the present invention.
Figure 2:
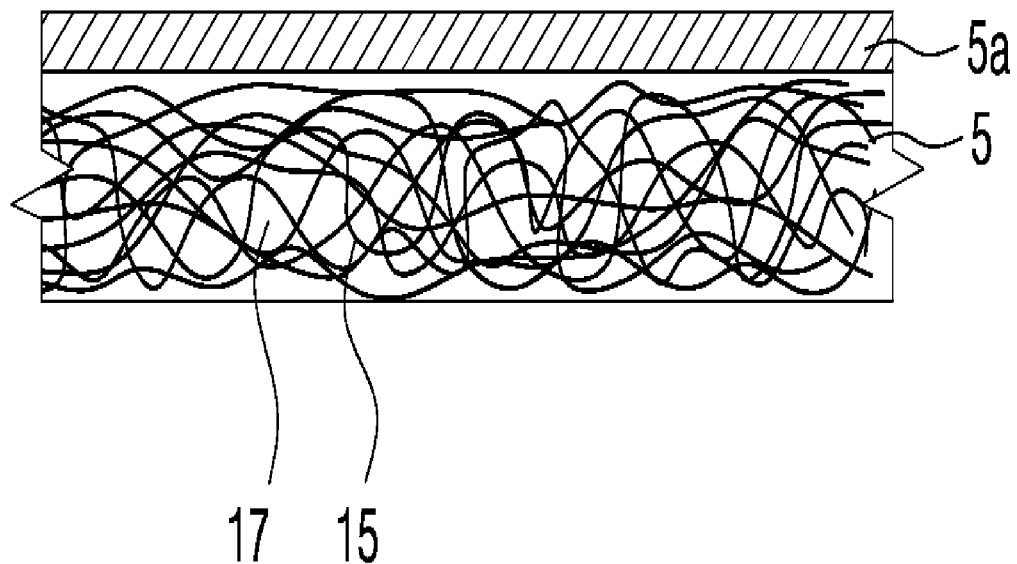
FIG. 2 is a cross-sectional view of a composite porous separator according to a second preferred embodiment of the present invention.

FIG. 1 is a cross-sectional view of a lithium secondary battery according to a first preferred embodiment of the present invention, and FIG. 2 is a cross-sectional view of a composite porous separator according to a second preferred embodiment of the present invention.

Referring to FIG. 1, the lithium secondary battery according to the first preferred embodiment of the present invention, that is, a lithium polymer battery, is configured to include a positive electrode 1, a pre-free gel-type polymer electrolyte 5, and a negative electrode 3, when forming a full cell for example.

The positive electrode 1 is provided with a positive electrode active material layer 11b on one surface of a positive electrode current collector 11a, and the negative electrode 3 is provided with a negative electrode active material layer 13b on one surface of a negative electrode current collector 13a.

However, the positive electrode 1 is arranged to face the negative electrode 3 and may be provided with a pair of positive electrode active material layers on both surfaces of the positive electrode current collector 11a to form a bi-cell.

The positive electrode active material layer 11b includes a positive electrode active material capable of reversibly intercalating and deintercalating lithium ions, and a typical example of such a positive electrode active material may be a material that can occlude and release lithium, such as $LiCoO_2$, $LiNiO_2$, $LiNiCoO_2$, $LiMn_2O_4$, $LiFeO_2$, $V_2O_5$, $V_6O_{13}$, TiS, MoS, or an organic disulfide compound or an organic polysulfide compound. However, in the present invention, it is of course possible to use other types of positive electrode active materials in addition to the positive electrode active material.

The negative electrode active material layer 13b includes a negative electrode active material capable of intercalating and deintercalating lithium ions, and such a negative electrode active material can be selected from the group consisting of a carbon-based negative active material of crystalline or amorphous carbon, a carbon fiber, or a carbon composite material, tin oxide, materials that lithiate these, lithium, lithium alloys, and mixtures thereof. However, the present invention is not limited to the negative electrode active material.

In the same manner as a method that was generally used in a conventional lithium ion battery, the positive electrode 1 and the negative electrode 3 may be obtained by: preparing a slurry by mixing an active material, a conductive agent, a binder and an organic solvent of an appropriate amount; casting the prepared slurry on both surfaces of an aluminum or copper sheet foil or mesh as positive and negative electrode current collectors 11a and 13a; and performing drying and rolling processes.

For example, the positive electrode may be obtained by casting a slurry consisting of $LiCoO_2$, Super-P carbon, and polyvinylidene fluoride (PVdF) on an aluminum foil as an active material, a conductive agent, and a binder, and the negative electrode may be obtained by casting a slurry consisting of MCMB (mesocarbon microbeads), super-P carbon, and PVdF on a copper foil. In the positive and negative electrodes, it is preferable to carry out roll-pressing in order to increase adhesion between particles and with the metal foils, after casting slurries, respectively.

The polymer electrolyte 5 includes: a porous nanofiber web 15 having a plurality of nanofibers 150; and a gel polymer portion 17 that is formed by impregnating an organic electrolytic solution into the porous nanofiber web 15 in which the organic electrolytic solution is formed by mixing a gel polymer forming monomer and a polymerization initiator, undergoing a gelling thermal treatment process, and thus synthesizing a gel-type gel polymer by a polymerization reaction of the gel polymer forming monomer.

According to the first embodiment, the porous nanofiber web 15 made of a single layer is used as a porous separator for playing an electrolyte matrix role.

The porous nanofiber web 15 may be formed by using any polymer that is dissolved in a solvent to form a spinning solution to then spin the spinning solution in an electrospinning method to thus form the nanofibers 150. In this case, a single polymer or a mixed polymer may be used for the porous nanofiber web 15. The polymer may be a swellable polymer that can be swelled in an electrolytic solution, a non-swellable polymer that cannot be swelled in an electrolytic solution, a heat-resistant polymer, a mixed polymer that is formed by mixing a swellable polymer and a non-swellable polymer, or a mixed polymer that is formed by mixing a swellable polymer and a heat-resistant polymer.

The porous nanofiber web 15 is formed by dissolving a single or mixed polymer in a solvent, to thus form a spinning solution, spinning the spinning solution to form an ultrafine fibrous porous nanofiber web, and calendering the ultrafine fibrous porous nanofiber web at a temperature equal to or lower than a melting point of the polymer.

In this case, a predetermined amount of inorganic particles may be contained in the spinning solution in order to enhance the heat resistance of the porous nanofiber web 15.

In addition, in the case of the mixed polymer of the swellable polymer and the non-swellable polymer, it is preferable that the swellable polymer and the non-swellable polymer are mixed at a weight ratio in a range of 6:4 to 1:9, preferably 5:5 to 3:7. When the non-swellable polymer is compared with the swellable polymer, the former has a molecular weight larger than the latter and thus has a melting point that is relatively high. In this case, the non-swellable polymer is preferably a resin having a melting point of 180° C. or higher, and the swellable polymer is preferably a resin having a melting point of 150° C. or lower, more preferably a resin having a melting point in a range of 100~150° C.

A swellable polymer that may be used in the present invention is a resin that is swelled in an electrolytic solution, and may be formed into an ultrafine fiber by an electrospinning method, for example, any one selected from the group consisting of: polyvinylidene fluoride (PVdF), poly (vinylidene fluoride-co-hexafluoropropylene), perfluoropolymer, polyvinyl chloride or polyvinylidene chloride, and co-polymer thereof; polyethylene glycol derivatives containing at least one of polyethylene glycol dialkylether and polyethylene glycol dialkyl ester; polyoxide containing at least one of poly (oxymethylene-oligo-oxyethylene), polyethylene oxide and polypropylene oxide; polyacrylonitrile co-polymer containing at least one of polyvinyl acetate, poly (vinyl pyrrolidone-vinyl acetate), polystyrene, polystyrene acrylonitrile co-polymer, and polyacrylonitrile methyl methacrylate co-polymer; and polymethyl methacrylate, and polymethyl methacrylate co-polymer, and any one combination thereof.

In addition, the heat-resistant or non-swellable polymer that may be used in the present invention is a resin that can be dissolved in an organic solvent for electrospinning and whose melting point is 180° C. or higher, in which the resin is swelled more slowly than the swellable polymer or is not swelled, by the organic solvent contained in an organic electrolytic solution, for example, any one selected from the group consisting of: aromatic polyester containing at least one of polyacrylonitrile (PAN), polyamide, polyimide, polyamide-imide, poly (meta-phenylene iso-phthalamide), polysulfone, polyether ketone, polyethylene terephthalate, polytrimethylene terephthalate, and polyethylene naphthalate; polyphosphazenes containing at least one of polytetrafluoroethylene, polydiphenoxy phosphazene, and poly {bis[2-2-methoxyethoxy phosphazene]}; polyurethane co-polymer containing at least one of polyurethane and polyether urethane; cellulose acetate, cellulose acetate butylrate, and cellulose acetate propionate.

Figure 3:
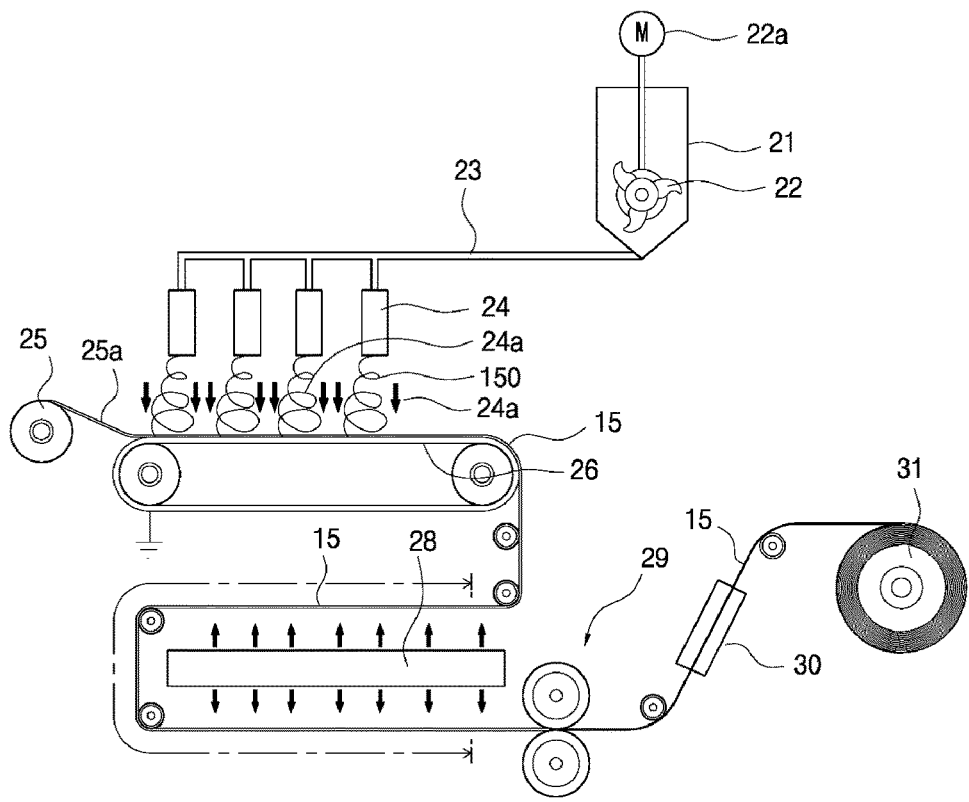
FIG. 3 is a diagram showing a process of manufacturing a porous separator that is used as a polymer electrolyte according to the present invention.

Meanwhile, the porous nanofiber web 15 is obtained by spinning a spinning solution in which a swellable polymer alone, or a mixed polymer that is obtained by mixing a swellable polymer with a heat-resistant or non-swellable polymer is dissolved. As shown in FIG. 3, air-electrospinning (AES) equipment may be preferably used to spin the spinning solution.

A spinning method can be used in the present invention can employ any one selected from general electrospinning, electrospray, electrobrown spinning, centrifugal electrospinning, and flash-electrospinning, in addition to the air-electrospinning (AES).

For example, the porous nanofiber web 15 that is prepared by the air-electrospinning (AES) is formed of 5 to 50 μm thick, preferably formed of 10 to 25 μm thick, more preferably formed of 10 to 15 μm thick. When the thickness of the porous nanofiber web 15 is less than 5 μm, it may not be only difficult to manufacture the porous nanofiber web 15, but an electric short may also happen since the thickness of the porous nanofiber web 15 is too thin. Meanwhile, when the thickness of the porous nanofiber web 15 is more than 50 μm, the thickness of the polymer electrolyte is also increased to cause ion conductivity to drop.

Nanofibers 150 to form the porous nanofiber web 15 have preferably the diameters of the fibers in a range of 50 nm to 2 μm.

When the diameter of the nanofiber 150 is less than 50 nm, it is difficult to manufacture the porous nanofiber web 15 and when it exceeds 2 μm, thickness of the porous nanofiber web 15 also causes a problem of being formed into a thick film.

A porosity of the porous nanofiber web 15 is set to be in a range of 60 to 80%, and the Gurley second is preferably from 5 to 30 seconds.

A small amount of inorganic particles contained in the porous nanofiber web 15 may include at least one selected from the group consisting of $Al_2O_3$, $TiO_2$, $BaTiO_3$, $Li_2O$, LiF, LiOH, $Li_3N$, BaO, $Na_2O$, $Li_2CO_3$, $CaCO_3$, $LiAlO_2$, $SiO_2$, SiO, SnO, $SnO_2$, $PbO_2$, ZnO, $P_2O_5$, CuO, MoO, $V_2O_5$, $B_2O_3$, $Si_3N_4$, $CeO_2$, $Mn_3O_4$, $Sn_2P_2O_7$, $Sn_2B_2O_5$, and $Sn_2BPO_6$, and a mixture thereof.

It is preferable that a content of the inorganic particles contained in the porous nanofiber web 15 is in a range of 10 to 25 wt % for the whole mixture, when a size of the inorganic particles is between 10~100 nm. More preferably, a content of the inorganic particles is in a range of 10~20 wt % for the whole mixture, and a size of the inorganic particles is between 15~25 nm.

In the case that a content of the inorganic particles is less than 10 wt % for the whole mixture, a film shape is not maintained, contraction occurs, and a desired heat-resistant property is not obtained. In the case that a content of the inorganic particles exceeds 25 wt % for the whole mixture, a spinning trouble phenomenon that contaminates a spinning nozzle tip occurs, and the solvent quickly evaporates, to thus lower strength of the film.

In addition, in the case that a size of the inorganic particles is less than 10 nm, a volume is too largely bulky and thus it is cumbersome to handle the mixture. In the case that a size of the inorganic particles exceeds 100 nm, a phenomenon of lumping the inorganic particles occurs and thus a lot of the inorganic particles are exposed out of the fibers, to thereby cause the strength of the fibers to drop.

The gel polymer portion 17 in the polymer electrolyte 5 is formed by: putting the porous nanofiber web 15 between the positive electrode 1 and the negative electrode 3, to then be integrally assembled in a case; filling an organic electrolytic solution that is formed by mixing a gel polymer forming monomer and a polymerization initiator at a state where the porous nanofiber web 15 has been integrally assembled in the case; and synthesizing a gel-type gel polymer by performing a polymerization reaction of the gel polymer forming monomer through a gelling heat treatment.

That is, the gel polymer electrolyte according to the present invention is formed by polymerizing the above-described gel polymer forming monomer in a conventional manner. For example, the gel polymer electrolyte may be formed by in-situ polymerizing the gel polymer forming monomer in the inside of an electrochemical device.

The in-situ polymerization reaction inside the electrochemical device may proceed through heat polymerization, in which the polymerization time may take approximately 20 minutes to 12 hours or so, and the thermal polymerization temperature may be 40 to 90° C.

For this purpose, the organic electrolytic solution incorporated in the porous nanofiber web 15 includes a non-aqueous organic solvent, a lithium salt solute, a gel polymer forming monomer, and a polymerization initiator.

The non-aqueous organic solvent may include carbonate, ester, ether, or ketone. The carbonate may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester may include butyrolactone (BL), decanolide, valerolactone, mevalonolactone, caprolactone, n-methyl acetate, n-ethyl acetate, n-propyl acetate, and the like. The ether may include dibutyl ether, etc. The ketone may include poly methyl vinyl ketone. However, the present invention is not limited to the non-aqueous organic solvent, and may also employ a mixture of at least one thereof.

In addition, the lithium salt acts as a source of lithium ions within a cell and enables a basic operation of a lithium battery. The examples of the lithium salt may be at least one selected from the group consisting of $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiSbF_6$, LiCl, LiI, $LiAlCl_4$, $LiN(C_xF_{2x+1}SO_2)(C_yF_{2y+1}SO_2)$ (here, x and y are natural numbers, respectively) and $LiSO_3CF_3$, or a mixture thereof.

For example, the gel polymer forming monomer may employ a methyl methacrylate (MMA) monomer needed to form polymethyl methacrylate (PMMA) by a polymerization reaction.

In addition, the gel polymer forming monomer may employ any monomer that undergoes a polymerization reaction by a polymerization initiator in which a polymer forms a gel polymer. For example, the gel polymer forming monomer may employ polyethylene oxide (PEO), polypropylene oxide (PPO), polyacrylonitrile (PAN), polyvinylidene fluoride (PVdF), polymethacrylate (PMA), polymethyl methacrylate (PMMA) or a monomer for a polymer thereof, or polyacrylate having two or more functional groups such as polyethylene glycol dimethacrylate or polyethylene glycol acrylate.

An amount of 1-10 wt % of the gel polymer forming monomer is preferably used in the organic electrolytic solution. When the content of the monomer is less than one, it is difficult to form the gel-type electrolyte, and when the content of the monomer exceeds 10 wt %, there is a problem of life deterioration.

An amount of 0.01 to 5 wt % of the polymerization initiator may be contained relative to the monomer.

Examples of the polymerization initiator may include organic peroxide or hydroperoxide such as benzoyl peroxide (BPO), acetyl peroxide, dilauryl peroxide, ditertbutylperoxide, cumyl hydroperoxide, or hydrogen peroxide, or an azo compound such as 2,2-azobis(2-cyanobutane), 2,2-azobis (methylbutyronitrile), AIBN (azobis iso-butyronitrile), or AMVN (azobis dimethyl-valeronitrile). The polymerization initiator is decomposed by heat to thus form a radical, reacts with a monomer by free radical polymerization to thus form a gel polymer electrolyte, that is, the gel polymer portion 17.

The gel polymer electrolyte that forms the gel polymer portion 17 is preferably made of a high conductive polymer that plays a role of a passage that carries lithium ions that are oxidized or reduced at the negative electrode or positive electrode during charge or discharge of a battery.

In this case, since the gel polymer forming monomer undergoes the polymerization reaction rapidly to form a gel polymer, the porous nanofiber web 15 maintains a web-like shape.

In addition to the above-mentioned components of the organic electrolytic solution according to the present invention, the organic electrolytic solution may contain other well-known additives selectively.

Meanwhile, as in the second embodiment shown in FIG. 2, the present invention can include a very thin pore-free polymer film 5a that is laminated on one side or both sides of the pore-free gel-type polymer electrolyte 5 of the first embodiment of the present invention and is used as an adhesive layer.

For the structure of the porous nanofiber web according to the second embodiment, for example, a first porous nanofiber web 15 is formed by spinning a first spinning solution in which a single or mixed polymer is dissolved by air-electrospinning (AES) by using a multi-hole spinning pack in which spinning nozzles are disposed at intervals along a travelling direction of a collector, and then a second porous nanofiber web of a thin film is stacked on top of the first porous nanofiber web 15 by using a second spinning solution in which a single polymer is dissolved, to thereby form the first and second porous nanofiber webs of a two-layer structure.

The polymer used to prepare the second spinning solution is a polymer resin that is swelled in an electrolytic solution, enables conducting of lithium ions, and has excellent adhesiveness, and may be made of any one of, for example, PVdF (polyvinylidene fluoride), PEO (polyethylene oxide), PMMA (polymethyl methacrylate), and TPU (thermoplastic polyurethane). In this case, the polymer such as the PVdF is the most preferable polymer having a swelling property in the electrolytic solution, enabling the excellent ion conductivity, and having an excellent adhesiveness.

Thereafter, when the first and second porous nanofiber webs of the two-layer structure are heat treated so as to oppose and pass through, for example, an infrared lamp heater that is set to a temperature slightly lower than the melting point of the second porous nanofiber web, in a subsequent step, the second porous nanofiber web is converted into a pore-free polymer film 5a to thereby obtain a laminate structure of the first porous nanofiber web 15 and the pore-free polymer film 5a.

The pore-free polymer film 5a is preferably formed into a thin film of 2 to 5 μm thick. When the pore-free polymer film 5a is less than 2 μm thick, it is weak to function as an adhesive layer, and when the pore-free polymer film 5a exceeds 5 μm thick, it is difficult to thin the thickness of the entire polymer electrolyte, and ion conductivity is also low.

The polymer electrolyte shown in FIG. 2 is formed by forming an electrode assembly by using a laminated composite porous separator in which the first porous nanofiber web 15 and the pore-free polymer film 5a have been laminated, filling the electrode assembly with an electrolytic solution, and performing a gelling heat treatment.

Figure 4:
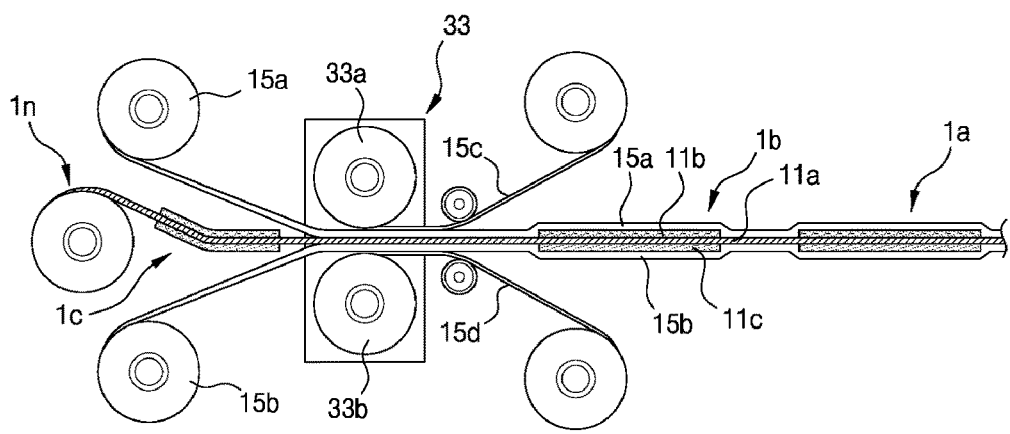
FIG. 4 is a diagram showing a process of sealing a positive electrode and a porous separator that is used as a polymer electrolyte according to the present invention.
Figure 5:
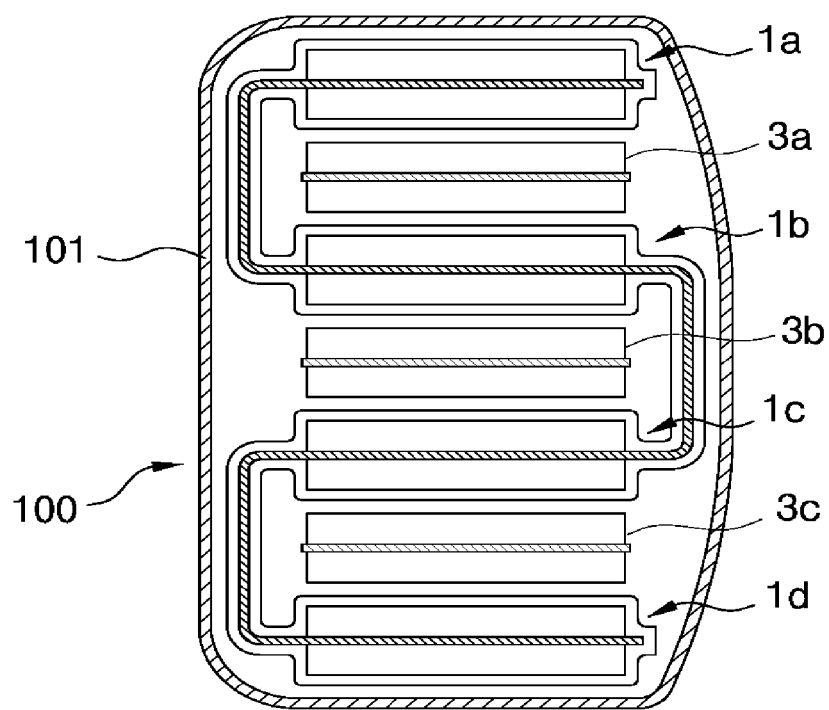
FIG. 5 is a schematic cross-sectional view of an electrode assembly that is assembled according to the present invention.
Figure 6:
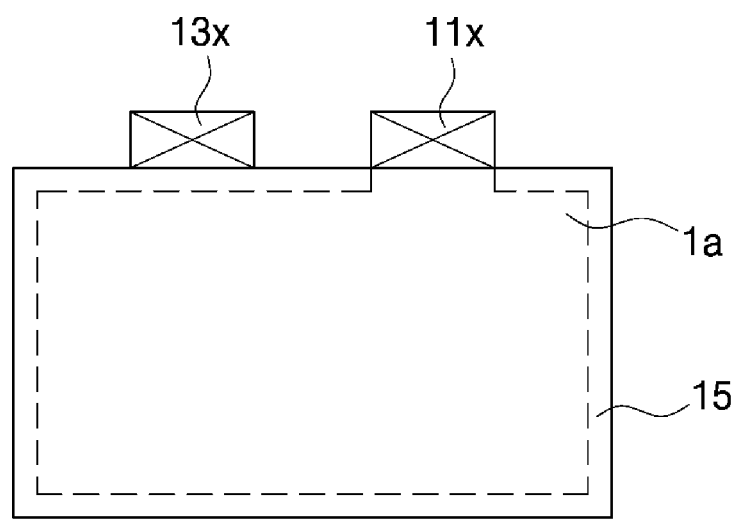
FIG. 6 is a schematic plan view of an electrode assembly that is assembled according to the present invention.
Figure 7:
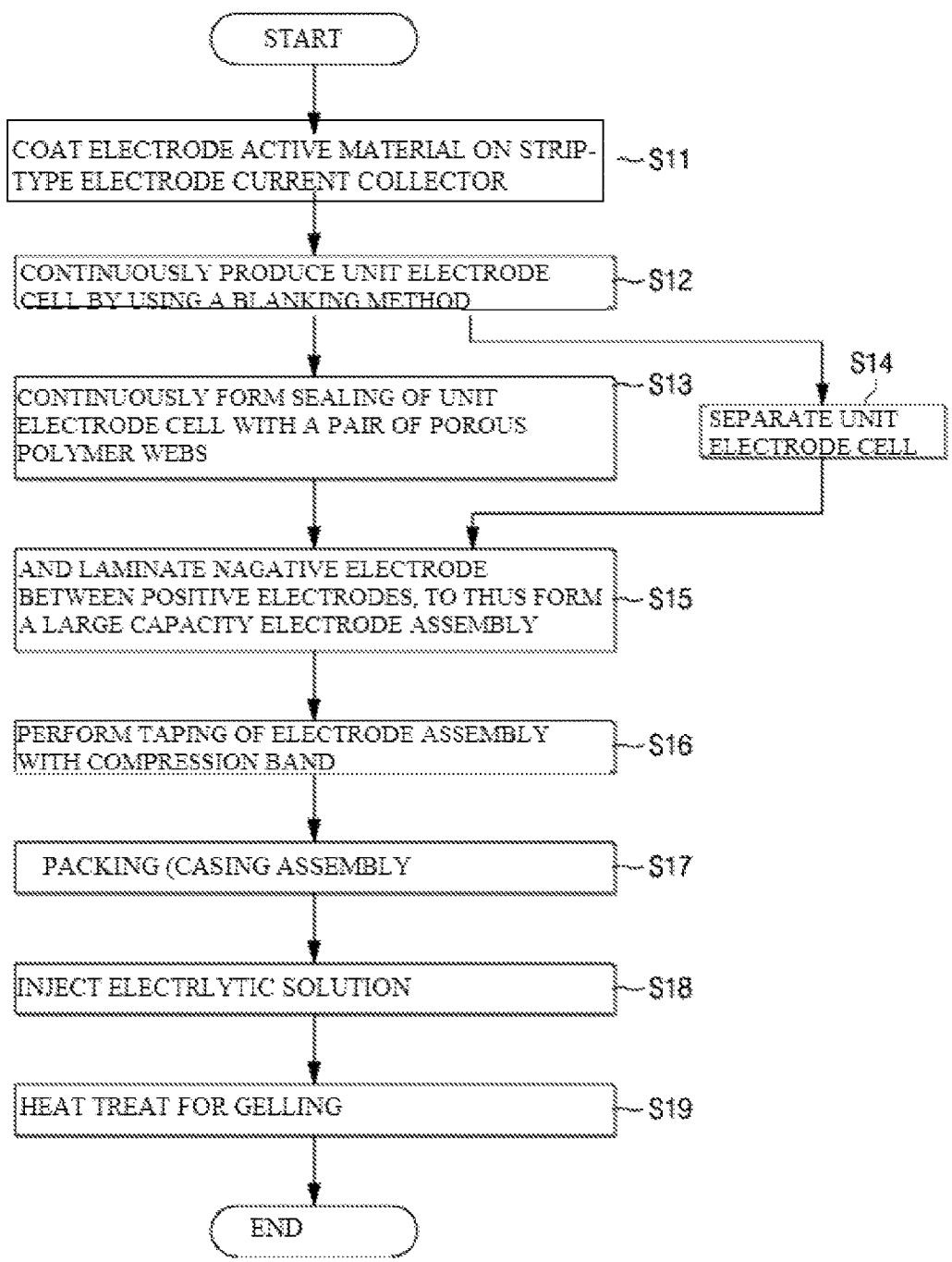
FIG. 7 is a flowchart view showing a process of assembling a lithium secondary battery according to the present invention.

Referring to FIGS. 3 to 6, a method for manufacturing a lithium polymer secondary battery according to the present invention will be described below. FIG. 3 is a diagram showing a process of manufacturing a porous separator that is used as a matrix of a polymer electrolyte according to the present invention. FIG. 4 is a diagram showing a process of sealing a positive electrode and a porous separator according to the present invention. FIG. 5 is a schematic cross-sectional view of an electrode assembly that is assembled according to the present invention. FIG. 6 is a schematic plan view of an electrode assembly that is assembled according to the present invention.

In the present invention, first, a nanofiber web 15 that is used as a porous separator as shown in FIG. 3 is produced by, for example, air-electrospinning (AES).

That is, when a high-voltage electrostatic force of 90 through 120 Kv is applied between each of spin nozzles 24 through which a single or mixed polymer spinning solution with a sufficient viscosity is spun and a collector 26, by using an air-electrospinning device, an ultrafine fiber 150 is spun to the collector 26, to thus form a porous nanofiber web 15. In this case, since air 24a is sprayed for each spin nozzle 24, the spun nanofiber 150 is prevented from blowing without being captured by the collector 26.

The mixed polymer spinning solution in the present invention is prepared by adding a non-swellable polymer material of 40 to 90 wt % and a swellable polymer material of 10 to 60 wt % in a two-component solvent or in a one-component solvent. In this case, it is preferable to use a two-component solvent that is formed by mixing a solvent of a high boiling point (BP) and a solvent of a low BP as the solvent used for the mixed polymer spinning solution.

The air-electrospinning device used in the present invention includes: a mixing tank 21 having an agitator 22 that uses a mixing motor 22a using a pneumatic pressure as a driving source; and a multi-hole nozzle pack (not shown) in which a number of spin nozzles 24 that are connected with a high-voltage generator are arranged in a matrix form, in order to prevent a phase separation, until a heat-resistant polymer material and a swelling polymer material are mixed with a solvent to then be spun in the case of using a mixed polymer. A mixed polymer spinning solution that is discharged through a number of the spin nozzles 24 that are connected with the mixing tank 21 via a fixed quantity pump (not shown) and a transfer tube 23 passes through the spin nozzles 24 that are electrically charged by the high-voltage generator to then be discharged as the nanofibers 150. Thus, the nanofibers 150 are accumulated on the collector 26 that is grounded and is configured in a conveyor belt form that moves at a constant speed, to thereby form a porous nanofiber web 15.

In this case, in the present invention, a transfer sheet 25a of high tensile strength is continuously sent to an upper portion of the collector 26 of the air-electrospinning device from a transfer roll 25 in order to improve workability of a subsequent process and a positive electrode sealing process to be described later, to thereby laminate the porous nanofiber web 15 on top of the transfer sheet 25a.

The transfer sheet 25a is made of, for example, paper, a nonwoven fabric made of a polymeric material that is not dissolved by a solvent contained in a mixed polymer spinning solution during spinning of the mixed polymer spinning solution, or a polyolefin-based film such as PE or PP. In the case that only the porous nanofiber web 15 is formed with no lamination on top of the transfer sheet 25a, a tensile strength of only the porous nanofiber web 15 is low, and accordingly it is difficult to execute a drying process, a calendering process and a winding process while being fed with a high feed rate.

Furthermore, after having produced the porous nanofiber web 15, it is difficult to execute a subsequent sealing process of a positive or negative electrode continuously with a high feed rate. However, in the case of using the transfer sheet 25a, a sufficient tensile strength is provided to thus significantly increase a processing speed.

In addition, when using only the porous nanofiber web 15, a sticking phenomenon to another object due to a static electricity may happen, and thus the workability falls, but the problem can be solved when using the transfer sheet 25a.

After the transfer sheet 25a is subjected to roll pressing of the electrode as shown in FIG. 4, it is peeled off and removed.

When spinning is performed by the air-electrospinning (AES) method using the multi-hole nozzle pack, after the spinning solution has been prepared as described above, spinning of the ultrafine nanofibers 150 of 0.3 to 1.5 μm in diameter is performed, and the nanofibers are fused in a three-dimensional network structure simultaneously with creation of the nanofibers, to thereby form a porous nanofiber web 15 of a layered structure on top of the transfer sheet 25a. The porous nanofiber web 15 made of the ultrafine nanofibers is ultra-thin and ultra-light and has a high ratio of a surface area compared to a volume and a high porosity.

Then, the thus-obtained porous nanofiber web 15 undergoes a process of adjusting an amount of the solvent and moisture remaining on the surface of the porous nanofiber web 15, while passing through a pre-air dry zone by a pre-heater 28. Then, a calendering process is done using a heating compression roller 29.

In the pre-air dry zone by the pre-heater 8, air of 20 to 40° C. is applied to the porous nanofiber web 15 by using a fan, thereby adjusting an amount of the solvent and moisture remaining on the surface of the porous nanofiber web 15. As a result, the porous nanofiber web 15 is controlled so as to be prevented from being bulky. The air blow of the fan plays a role of increasing strength of the separator and controlling porosity of the separator.

In this case, if calendering is accomplished at a state where evaporation of the solvent has been excessively performed, porosity is increased but strength of the web is weakened. Reversely, if less evaporation of the solvent occurs, the web is melted.

The porous nanofiber web calendering process following the pre-air dry process is performed using the heating compression roller 29. In this case, if the calendering temperature is too low, the web becomes too bulky to have stiffness, and if the calendering temperature is too high, the web is melted to thus clog the pores. In addition, the thermal compression should be performed at a temperature that the solvent remaining in the web can be completely evaporated. If too little evaporation of the solvent occurs, the web is melted.

In the present invention, the heating compression roller 29 is set to be at a temperature of 170 to 210° C. and a pressure of 0 to 40 kgf/cm$^2$ except for dead weight pressure of the compression roller, to then perform calendering of the porous nanofiber web 15 and execute a primary pre-shrinkage, and to thereby maintain stabilization of the porous nanofiber web 15 at the time of an actual use.

In the case that the heat-resistant polymer material and the swelling polymer material are a combination of, for example, polyacrylonitrile (PAN) and polyvinylidene fluoride (PVdF), respectively, the calendering temperature and pressure are as follows:

Combination of PAN and PVdF: 170 to 210° C. and 20 to 30 kgf/cm$^2$

Once the porous nanofiber web calendering process is executed, the porous nanofiber web of 10 to 50 μm thick is obtained.

In addition, the porous nanofiber web 15 obtained by the calendering process carried out as necessary in the present invention, undergoes a process of removing the remaining solvent or moisture by using a secondary hot-air dryer 30 at a temperature 100° C. and with a wind speed of 20 m/sec, to then be wound on a winder 31 as a winding roll of the porous nanofiber web 15 at a state where the transfer sheet 25a is disposed in the inside of the porous nanofiber web 15.

Hereinbelow, a process of sealing an electrode and a process of assembling a battery will be described with reference to FIGS. 4 to 7.

Referring to FIG. 4, any one of the positive electrode 1 and the negative electrode 3 can be sealed by a sealing process by using two sheets of porous nanofiber webs 15 as a separator. In this embodiment, sealing of the positive electrode 1 will be described as an example.

First, the positive electrode 1 is formed by: casting slurries containing positive electrode active materials 11b and 11c on both sides of a strip-shaped positive electrode current collector 11a to form a bi-cell (or a full cell); roll pressing the slurry-cast strip-shaped positive electrode current collector 11a to thus form a positive electrode strip 1n in which a plurality of unit positive electrode cells 1a-1d are sequentially formed; and winding the positive electrode strip 1n on a reel by using a winding machine (S11).

In addition, the negative electrode 3 is formed by: forming a bi-cell (or a full cell) structure in the same way as the positive electrode (S11), thereafter separating an individual unit negative electrode cell from the bi-cell (or a full cell) structure (S14), and preparing a plurality of unit negative electrode cells 3a-3c as shown in FIG. 5.

The positive electrode strip 1n undergoes a blanking process by using blanking equipment before being wound on a reel or before a sealing process shown in FIG. 4 starts, to thereby partially separate a plurality of unit positive electrode cells 1a-1d from the positive electrode strip 1n, while leaving a portion to form a positive electrode terminal 11x (S12).

Further, in the blanking process, the positive electrode strip 1n is transferred by a unit process length according to a step-by-step mode transfer method, then a blanking process is executed for respective unit processes to thus form a plurality of blanks between adjacent unit positive electrode cells 1a-1d, and spaces are formed between the unit positive electrode cells 1a-1d and masking tape applying regions formed on both sides of the unit positive electrode cells 1a-1d, to thereby blank the respective unit positive electrode cells 1a-1d to have a rectangular shape having a certain area such as a rectangular or square area, and to interconnect mutually.

Then, as shown in FIG. 4, in a state where a pair of porous nanofiber webs 15a and 15b that are respectively laminated on transfer sheets 15c and 15d are arranged on the upper and lower portions of the positive electrode strip 1n, the pair of porous nanofiber webs 15a and 15b and the positive electrode strip 1n are made to continuously pass through a roll pressing device 33 formed of a pair of hot press rolls 33a and 33b, to thereby execute a roll pressing process that is performed by applying a heat and pressure (S13).

In this case, a pair of porous nanofiber webs 15a and 15b has a strip shape having a width wider by a predetermined length than the width of the positive electrode strip 1n, as shown in FIG. 6. The pair of porous nanofiber webs 15a and 15b are preferably set to be equal to widths of the unit negative electrode cells 3a-3c. A reference alphanumeric designation '11x' denotes a positive electrode terminal and a reference alphanumeric designation '13x' denotes a negative electrode terminal, in FIG. 6.

In addition, after undergoing the roll pressing process for the sealing of the unit positive electrode cells 1a-1d, the transfer sheets 15c and 15d are peeled off and removed from the porous nanofiber webs 15a and 15b as shown in FIG. 4.

As a result, the pair of porous nanofiber webs 15a and 15b can be sealed by sequentially sealing a plurality of unit positive electrode cells 1a-1d of the positive electrode strip 1n by using a roll-to-roll method, to thus have a high productivity.

The plurality of unit positive electrode cells 1a-1d have been sequentially sealed by using the pair of porous nanofiber webs 15a and 15b as separators in the above-described embodiment, but it is possible to seal the plurality of unit positive electrode cells 1a-1d in a different way.

Then, for example, as shown in FIG. 5, the unit negative electrode cells 3a-3c are respectively laminated between the plurality of unit positive electrode cells 1a-1d, to thus form an electrode assembly 100 (S15), and then the electrode assembly 100 is taped with a compression band 101 made of a material that is not swelled in an organic solvent and having an excellent tensile strength so as to surround the outside of the electrode assembly 100 (S16).

In general, in a lithium ion polymer battery, an electrode assembly 100 in which a plurality of unit positive electrode cells and a plurality of unit negative electrode cells are stacked has is a problem that an inner portion of the electrode assembly 100 is expanded during charging and discharging to thus cause expansion and contraction to occur in the stacking direction of the cells. When this operation is repeated, the liquid-phase electrolytic solution that has been impregnated in the electrode assembly is impregnated with an electrolyte, to thereby cause a phenomenon of separating each of the electrodes and the electrolyte from each other. As a result, the interfacial resistance gradually increases, to thereby cause a problem of reducing an open circuit voltage (OCV).

In the present invention, when the outside of the electrode assembly 100 is taped with a thin film compression band 101 made of a non-swellable material as described above, the expansion and contraction of the electrode assembly 100 is induced to be made to a lateral direction instead of the vertical direction of the electrode assembly 100 during charging and discharging process, to thus prevent segregation between the electrolyte and each of the electrodes, to thus suppress an increase in the interfacial resistance, and to thereby minimize a reduction in the open circuit voltage (OCV).

Furthermore, in the present invention, since a portion of the swellable polymer is charged into the positive electrode 1 and the negative electrode 3 at a state where the portion of the swellable polymer is in succession with the polymer electrolyte 5, the portion of the swellable polymer is adhered to the positive electrode 1 and the negative electrode 3 as well as the polymer electrolyte 5, to thereby minimize a reduction in the open circuit voltage (OCV).

The compression band 101 may be made of, for example, an olefin-based film such as a PP/PE or PE/PP/PE nonwoven fabric or a PET film, or a ceramic thin film, which is available from Celgard Co., Ltd.

In the embodiment illustrated in FIG. 5, it has been described with respect to the structure of forming a large capacity of the electrode assembly 100 by respectively laminating a plurality of unit negative electrode cells 3a-3c between a plurality of unit positive electrode cells 1a-1d by using a Z-folding method, but the present invention is not limited thereto. Alternatively, it is possible to form the electrode assembly 100 by using other methods and perform taping with the compression band 101.

In this case, taping of the compression band 101 may be performed at a state where at least one reinforcing plate is assembled on one side or either side of the electrode assembly 100, as necessary.

For example, the plurality of unit negative electrode cells 3a-3c other than the plurality of unit positive electrode cells 1a-1d are subsequently sealed by using the pair of porous nanofiber webs 15a and 15b, and then a plurality of unit positive electrode cells 1a-1d are laminated between a plurality of unit negative electrode cells 3a-3c, to thus form a large capacity of the electrode assembly 100.

In addition, the porous nanofiber webs 15a and 15b are placed between the positive electrode 1 and the negative electrode 3, and then are integrated by a heat lamination process, to then be laminated or wound in a roll type to thereby be assembled in a case.

Further, the porous nanofiber webs 15a and 15b are bonded on one surface of the positive electrode 1 and the negative electrode 3, and then the positive electrode 1 and the negative electrode 3 on one surface of which the porous nanofiber webs 15a and 15b are formed are laminated one on the other, to then be integrated by a heat lamination process, and to then be laminated or wound in a roll type, to thereby be assembled in a case.

Then, the electrode assembly 100 that has been taped with the compression band 101 is built in a case (not shown) (S17), the above-described organic electrolytic solution is injected into the case, and heat-treated and sealed so that a gelling process is achieved by a polymerization reaction (S18 and S19).

The gelling heat treatment process is achieved by injecting the organic electrolytic solution, heating under the condition of a range of 20 minutes to 720 minutes at a temperature of 40° C. to 90° C. and then cooling.

In the present invention, since the porous nanofiber webs 15a and 15b disposed between the positive electrode 1 and the negative electrode 3 are porous separators having a three-dimensional pore structure, impregnation will be done very quickly when an organic electrolytic solution is injected into the case.

In this case, a gel polymer forming monomer undergoes the polymerization reaction rapidly by a polymerization initiator, to thus form a gel-type polymer, but keep the porous nanofiber web 15 to maintain a web-like shape.

As a result, the polymer electrolyte 5 is made to form a gel at a state where the gel polymer forming monomer has been impregnated into pores of the porous nanofiber web 15, to thus form a gel polymer portion 17. Accordingly, as a whole, a pore-free gel-type electrolyte in which a liquid-phase organic solvent does not substantially remain is formed, and simultaneously the porous nanofiber web 15 is not swelled in the electrolytic solution but maintained as a matrix shape.

As a result, the gel-type gel polymer portion 17 exerts a function as a lithium ion conductor, which carries lithium ions to be oxidized or reduced at the negative electrode 3 and the positive electrode 1 at the time of charging and discharging of the battery, and the porous nanofiber web 15 plays a role of a separator that physically isolates the positive electrode 1 and the negative electrode 3, to thereby prevent a short circuit between the positive electrode 1 and the negative electrode 3, to thus improve the safety.

In this case, part of the gel polymer is penetrated into the positive electrode 1 and the negative electrode 3 through the gelling process, to thus reduce the interfacial resistance between each of the electrodes and the polymer electrolyte 5 and simultaneously promote thinning of a thin film of the polymer electrolyte 5.

The porous nanofiber web 15 according to the present invention impregnates the injected organic electrolytic solution rapidly and uniformly, and thus reveals the cell characteristics with respect to the entirety of the electrolyte membrane uniformly.

In the above-described embodiment, it has been illustrated to use a porous nanofiber web 15 of a single layer made of nanofibers 150 as a separator in order to form a polymer electrolyte 5, but the present invention is not limited thereto but may employ a composite porous separator of a multi-layer structure.

Figure 8:
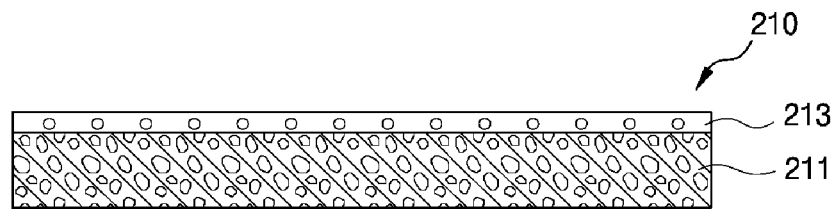
FIG. 8 is a cross-sectional view of a composite porous separator according to a third preferred embodiment of the present invention.
Figure 9:
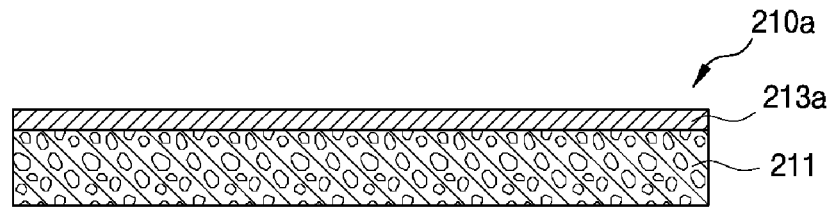
FIG. 9 is a cross-sectional view of a composite porous separator according to a fourth preferred embodiment of the present invention.

The accompanying FIGS. 8 and 9 are cross-sectional views respectively illustrating an example of a composite porous separator according to the present invention.

First, as shown in FIG. 8, the composite porous separator 210 in accordance with the present invention includes: a porous nonwoven fabric 211 that is used as a matrix and having fine pores; and a porous nanofiber web 213 that is used as an adhesive layer on at least one side of the porous nonwoven fabric 211 and is impregnated with an organic electrolytic solution.

The porous nonwoven fabric 211 that can be used as a substrate may be formed by using any one of a nonwoven fabric made of PP/PE fibers of a double structure in which PE is coated on an outer periphery of a PP fiber as a core, a PET nonwoven fabric made of polyethylene terephthalate (PET) fibers: or a nonwoven fabric made of cellulose fibers.

The porous nonwoven fabric 211 also has a porosity of a range of 70 to 80, and the thickness of the porous nonwoven fabric is preferably set in a range of 10 to 40 um.

When the porous nanofiber web 213 that is laminated on one side of the porous nonwoven fabric 211 is interposed and assembled between a negative electrode and a positive electrode (not shown), the porous nanofiber web 213 plays a role of an adhesive layer to facilitate bonding with the negative electrode. To this end, the porous nanofiber web 213 is obtained by electrospinning a polymer having excellent adhesion with a negative electrode active material, for example, polyvinylidene fluoride (PVdF).

In addition, since the porous nonwoven fabric 211 has pores that are too large, an ultra-thin pore-free film 213a is preferably applied in place of the porous nanofiber web 213 to lower the porosity like the separator 210a according to the embodiment shown in FIG. 9 in which the ultra-thin pore-free film 213a is formed by converting the porous nanofiber web 213 into a pore-free polymer film.

The porous nanofiber web 213 and the pore-free film 213a may use polymers that are swelled in the electrolytic solution and allow the ion conductivity of the electrolyte, for example, any one of PVdF (polyvinylidene fluoride), PEO (Poly-Ethylene Oxide), PMMA (polymethyl methacrylate), and TPU (Thermoplastic Poly Urethane).

In particular, the PVdF is the most preferable as the polymer basically having a swelling function in the electrolytic solution, allowing the ion conductivity of the electrolyte, and providing excellent adhesion with the negative electrode active material.

The PVdF may be, for example, more preferably, a CTFE (chlorotrifluoroethylene)-based PVdF co-polymer containing 15 to 20 wt % of CTFE in VF (vinylidene fluoride), or a HFP (hexafluoropropylene)-based PVdF co-polymer containing 4 to 12 wt % of HFP in VF.

In the case that the CTFE-based PVdF co-polymer contains a CTFE co-monomer less than 15 wt %, it is not possible to prepare a PVdF co-polymer, while in the case that the CTFE-based PVdF co-polymer contains a CTFE co-monomer more than 20 wt %, heat resistant properties of the PVdF co-polymer deteriorate, the PVdF co-polymer is too soft, and absorption of the electrolyte is too much, to thus cause a problem of making it difficult to be used as a separator.

In addition, in the case that the HFP-based PVdF co-polymer contains a HFP co-monomer less than 4 wt %, it is not possible to prepare a PVdF co-polymer, while in the case that the HFP-based PVdF co-polymer contains a HFP co-monomer more than 2 wt %, heat resistant properties of the PVdF co-polymer deteriorate, to thus cause a problem of making it difficult to be used as a separator.

The CTFE-based PVdF co-polymer may use Solef® 32008 of Solvay Solef® PVdF Fluoropolymer Resins supplied by Solvay Solexis, and the HFP-based PVdF co-polymer may use Solef 21216 of Solvay Solef® PVdF Fluoropolymer Resins, or KYNAR FLEX LBG of ARKEMA KYNAR® PVdF Fluoropolymer Resins.

Since CTFE or HFP is included when the CTFE-based PVdF co-polymer and the HFP-based PVdF co-polymer produce the co-polymer, there is an advantage that the ion conductivity is improved more than the PVdF made of homo-polymers of VF when the PVdF co-polymer is used as a separator.

Figure 10:
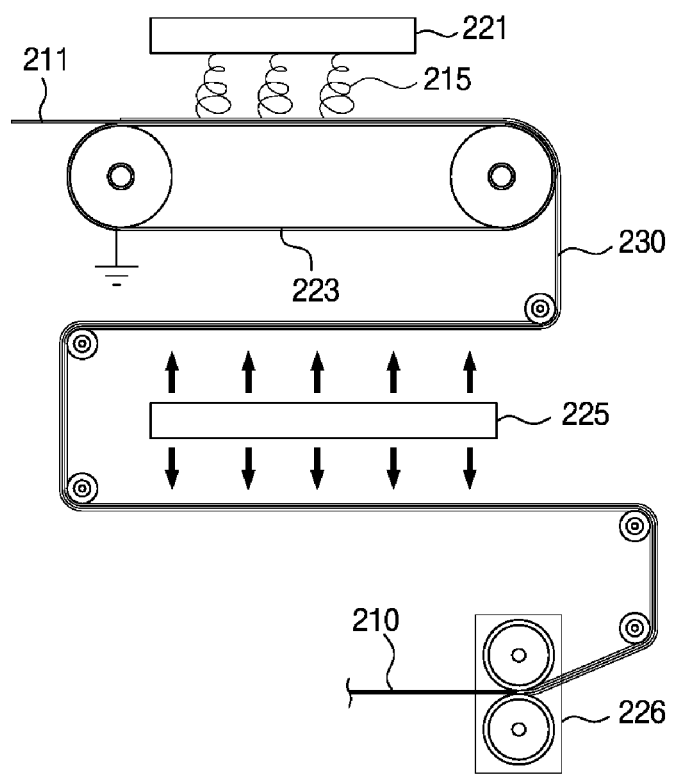
FIG. 10 is a diagram showing a process of manufacturing a composite porous separator according to the present invention.

In addition, the porous nanofiber web 213 is formed by: for example, dissolving a polymer that is swellable in an electrolytic solution and in which electrolyte ions are conductible in the electrolytic solution in a solvent to thus form a spinning solution; and electrospinning ultrafine nanofibers 215 on one side of the porous nonwoven fabric 211 by using the spinning solution from a multi-hole nozzle pack 221 as shown in FIG. 10, to then make the ultrafine fibers be collected on the porous nonwoven fabric 211 to form the porous nanofiber web.

The porous nanofiber web 213 is formed by forming a porous nanofiber web consisting of ultrafine nanofibers 215, and calendering the resulting porous nanofiber web at a temperature lower than a melting point of a polymer in a calender device 226.

The pore-free film 213a may be formed by forming the porous nanofiber web 213 on one side of the porous nonwoven fabric 211 and then heat treating the surface of the porous nanofiber web 213 at a temperature lower than a melting point of a polymer (e.g., PVdF) by using a heater 225 in a subsequent step, to thereby convert the porous nanofiber web 213 into the pore-free film 213a.

The reason why a heat treatment process may be performed at a heat treatment lower temperature somewhat lower than the melting point of the polymer, is that the residual solvent remains in the polymer nanofiber web.

The average diameter of the fibers constituting the porous nanofiber web 213 has a very large effect on the porosity and the pore size distribution. The smaller the fiber diameter becomes, the smaller the pore size becomes, and the smaller the pore size distribution also becomes. In addition, the smaller the fiber diameter becomes, so the specific surface area of the fiber increases. Accordingly, a leakage-preventive capacity of the electrolytic solution increases, and thus the potential for leakage of the electrolytic solution is reduced.

The fiber diameter constituting the porous nanofiber web 213 is in a range of 0.3 ~1.5 µm. The thickness of the porous nanofiber web 213 used to form the pore-free film is in a 1~10 µm range, preferably the porous nanofiber web 213 is made of an extremely thin film of 3~5 µm thick.

The porous nanofiber web that is made of ultrafine nanofibers has the following features such as ultrathinning, ultra-lightweight, a high specific surface area to volume ratio, and a high porosity.

The pore-free film 213a applied to the embodiment does not act as a resistance since the pore-free film 213a is swelled in the organic electrolytic solution when the pore-free film 213a is impregnated in the organic electrolytic solution, while allowing the conduction of lithium ions, and is formed of an ultrathin film, and increasing the mobility of the lithium ions.

When the pore-free film 213a is compressed to be adhered on the surface of a negative electrode active material layer as described above, at the time of an electrode assembly at a later time, the pore-free film 213a is swelled while allowing the conduction of lithium ions but blocking formation of a space between the negative electrode and the separator 201a, to thereby prevent lithium ions from being stacked and collected to then prevent a phenomenon of being precipitated into a lithium metal. As a result, it is possible to inhibit dendrite formation on the surface of the negative electrode to thus enhance stability.

The spinning solution that is prepared by electrospinning the porous nanofiber web 213 may contain a predetermined amount of inorganic particles to improve the heat resistance and strength. The content of inorganic particles and the like are applied in the same manner as in forming the porous nanofiber web 15.

The composite porous separators 210 and 210a are applied to a lithium polymer battery including a positive electrode, a gel-type polymer electrolyte, and a negative electrode.

As shown in FIG. 1 or 5, the above composite porous separators 210 and 210a are sealed, the electrode assembly is prepared in which the positive and negative electrodes are assembled in the electrode assembly, the electrode assembly is encased in a case, and an organic electrolytic solution is injected into the case, to then perform a gelling heat treatment and thus form a gel-type polymer electrolyte between the positive and negative electrodes.

In this case, after the assembly of the electrode assembly, the electrode assembly is contained in a vessel such as an aluminum or aluminum alloy can or the like, an opening portion is closed with a cap assembly, and an organic electrolytic solution that is formed by mixing a gel polymer forming monomer and a polymerization initiator is injected into the vessel. Then, the porous nanofiber web 213 or the pore-free film 213a is wet in the electrolytic solution and is swelled while being changed into the gel.

Part of the porous nanofiber web 213 or the pore-free film 213a that is swelled is pushed into the inside of the larger pores entering the porous nonwoven fabric 211, thereby blocking an entrance of the pore at one side of the porous nonwoven fabric 211, to thus lower the porosity.

In particular, thickness of the pore-free film 213a laminated on the porous nonwoven fabric 211, is in a range from 1 to 10 µm, preferably is made of an ultrathin film of 3 to 5

µm. Accordingly, when the electrolytic solution is injected and impregnated into the pore-free film 213a, the pore-free film 213a is swelled, and thus fine pores are formed to thereby allow movement of lithium ions. As a result, while a micro-short phenomenon will not occur, characteristic of OCV can be greatly improved.

In addition, when the electrolytic solution is injected and impregnated into the porous nanofiber web 213 laminated on the porous nonwoven fabric 211, the nanofibers of the nanofiber web is swelled by about 500 times, and thus the pore size is reduced, to thereby be made into a film. As a result, movement of the lithium ions is allowed through the fine pores of the nanofiber web, the occurrence of the micro-short phenomenon is blocked to thereby greatly improve the OCV characteristics.

Furthermore, according to the present invention, since the porous nonwoven fabric 211 is used as a substrate, and one side of the nonwoven fabric is made of, for example, PVdF pore-free film 213a, the pore-free film 213a having the excellent adhesion is assembled in close contact with the surface of the negative electrode, to thereby serve to suppress dendrite formation.

Hereinbelow, a method of manufacturing the composite porous separator of the present invention will be described with reference to FIGS. 10 and 11.

As shown in FIG. 10, in order to form a composite porous separator 210 in accordance with an embodiment of the present invention, a polymer that is swellable in an electrolytic solution and that allows electrolyte ions to be conductible in the electrolytic solution is dissolved in a solvent to thus prepare a spinning solution.

Thereafter, ultrafine nanofibers 215 are electrospun on one side of the porous nonwoven fabric 211 that is transferred along a lower collector 223 by using the spinning solution from a multi-hole nozzle pack 221, for example, in an air-electrospinning method, to then form the porous nanofiber web 230 to thus form a two-layer structure laminate.

The air-electrospinning (AES) method according to the present invention is a spinning method, in which a high voltage electrostatic force of 90~120 Kv is applied between the spinning nozzles of the multi-hole nozzle pack 21 from which a polymer solution is spun and the collector 23, and thus ultrafine fibers are spun on the collector 23, to thus form the porous polymer web 230, in which case air is sprayed for each spinning nozzle to thus prevent the spun fibers from flying without being collected on the collector 23.

The two-layer structure laminate is calendered in a calender device 226 to thus achieve the thickness control of the laminate, and to thereby obtain a composite porous separator 210 made of the porous nonwoven fabric 211 and the porous polymer nanofiber web 213 as shown in FIG. 8.

Meanwhile, in the case of producing a composite porous separator 210a in accordance with another embodiment, on one side of the porous nonwoven fabric 211, the porous nanofiber web 230 is laminated on one side of the porous nonwoven fabric 211, and the porous nanofiber web 230 is fed in a state of being exposed to the heater 225. Then, the porous nanofiber web 230 is converted to the pore-free film 213a.

Then, the two-layer structure laminate is calendered in the calender device to thus achieve the thickness control of the laminate, and to thereby obtain a composite porous separator 210a made of the porous nonwoven fabric 211 and the pore-free film 213a as shown in FIG. 9.

Figure 11:
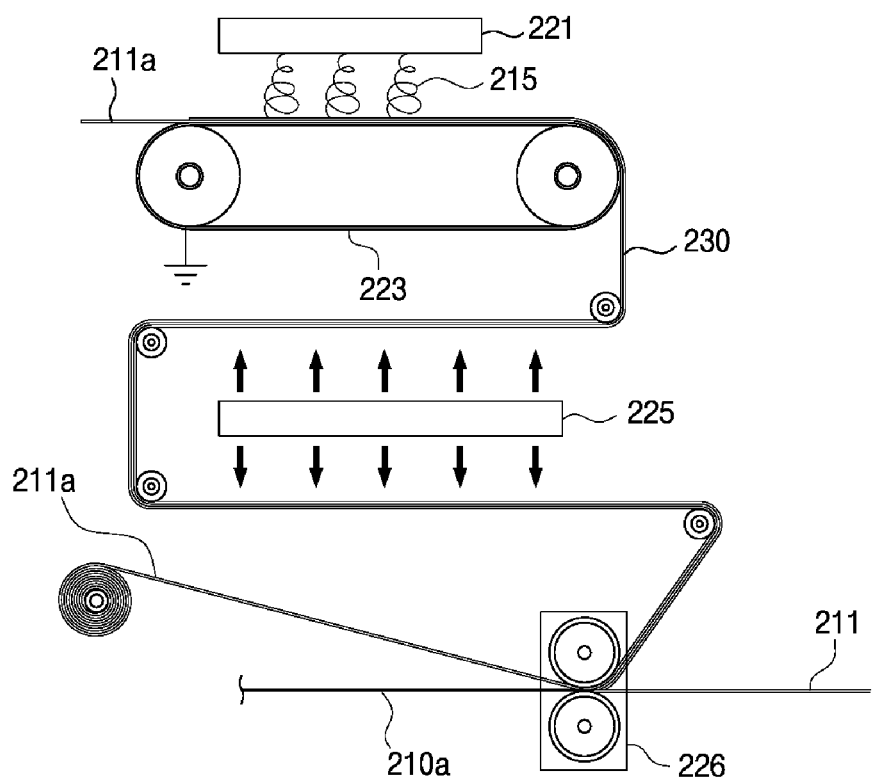
FIG. 11 is a diagram showing a modified process of manufacturing a composite porous separator according to the present invention.

However, as shown in FIG. 11, according to the process of manufacturing the composite porous separator according to the present invention, ultrafine nanofibers 215 are electrospun on one side of a transfer sheet 211a that is transferred along a lower collector 223 by using the spinning solution from a multi-hole nozzle pack 221, to then form the porous nanofiber web 230 made of the ultrafine nanofibers.

The transfer sheet 211a may be formed by using, for example, a paper, a nonwoven fabric made of a polymeric material that is not dissolved by a solvent contained in a spinning solution during spinning of the spinning solution, or a polyolefin-based film such as PE or PP. In the case that only the porous nanofiber web is formed with no lamination on top of the transfer sheet 211a, a tensile strength of only the porous nanofiber web is low, and accordingly it is difficult to execute a drying process, a calendering process and a winding process while being fed with a high feed rate.

Furthermore, after having produced the porous nanofiber web, it is difficult to execute a subsequent sealing process of a positive or negative electrode continuously with a high feed rate. However, in the case of using the transfer sheet 211a, a sufficient tensile strength is provided to thus significantly increase a processing speed.

In addition, when using only the porous nanofiber web, a sticking phenomenon to another object due to a static electricity may happen, and thus the workability falls, but the problem can be solved when using the transfer sheet 211a.

Furthermore, the electrospun nanofibers are collected on the collector and are laminated along the pattern of the collector (For example, when the nanofibers are spun on a diamond pattern, the nanofibers start to be collected along the initial diamond pattern.).

Thus, in order to make a porous nanofiber web of nanofibers having good uniformity such as a pore size, permeability, thickness, and weight, it is more suitable to spin nanofibers on paper than a nonwoven fabric.

In the case of performing a calendaring process by spinning nanofibers directly on a nonwoven fabric, a control of a calendering temperature is limited by the melting point of the nonwoven fabric. A coupling temperature between PVdF fibers is about 150° C., but the melting point of the nonwoven fabric is about 110 to 130° C. lower than this coupling temperature. Therefore, when nanofibers are spun on paper to form a porous nanofiber web, a primary calendaring process is executed at about 150° C., and a secondary calendaring process is executed at a temperature lower than the primary calendaring temperature, to thereby be laminated with the nonwoven fabric, a solid bond can be achieved between the fibers to thus make a highly completed porous nanofiber web.

In addition, when forming a porous nanofiber web of nanofibers by using a transfer sheet such as paper, a residual solvent contained in the nanofiber web is absorbed by the transfer sheet such as paper, to thus prevent the nanofibers from being melted by the residual solvent, that is, prevent a re-melting phenomenon of the nanofibers by the residual solvent, and to also play a role of controlling of an amount of the residual solvent as appropriate.

Thereafter, the porous nanofiber web 230 formed on the transfer sheet 211a is calendered in the calender device 226 by laminating the porous nanofiber web 230 obtained in the residual state the solvent on one side of the porous nonwoven fabric 211, to thereby make it possible to form a composite porous separator 210 of a two-layer structure according to an embodiment. The transfer sheet 211a is peeled and removed after the lamination process as shown in FIG. 11.

Considering that volatilization of the solvent may not be made well in accordance with the type of a polymer when using a single solvent, in the present invention, a process of adjusting the amount of the residual solvent and moisture remaining on the surface of the porous nanofiber web may be undergone while passing through a pre-air dry zone according to a pre-heater 225 after the spinning process.

The separator made of the porous nanofiber web with a single layer or multi-layer structure has a low tensile strength, and thus the tensile strength of the separator can be improved by using a porous nonwoven fabric made of a relatively high tensile strength nonwoven fabric as a support as in the present invention.

Although the case that the composite porous separator 210 or 210a has been formed into the two-layer structure in which the porous nanofiber web 213 or the pore-free film 213a has been laminated on one side of the porous nonwoven fabric 211, has been described in the embodiment, it is possible to form the composite porous separator 210 or 210a of a three-layer structure in which the porous nanofiber web 213 or the pore-free film 213a is laminated on either side of the porous nonwoven fabric 211, as necessary.

In this case, a portion of the porous nanofiber web 213 or the pore-free film 213a laminated on either side of the porous nonwoven fabric 211 is incorporated in the surface layer of the porous nonwoven fabric 211 to partially block the pores of the porous nonwoven fabric 211, to thereby play a role of lowering porosity of the porous nonwoven fabric 211 and play a role of an adhesive layer that serves to increase an adhesive force between the composite porous separator 210 or 210a and each of the positive and negative electrodes.

In the case that the composite porous separator 210 or 210a has been formed into the two-layer structure in which the porous nanofiber web 213 or the pore-free film 213a has been laminated on one side of the porous nonwoven fabric 211, it is preferable that the porous nanofiber web 213 or the pore-free film 213a of the separator should be assembled and adhered with the negative electrode, to accordingly inhibit dendrite formation on the surface of the negative electrode to thereby promote improvement of stability.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

The present invention relates to a polymer electrolyte that is formed by injecting an organic electrolytic solution that is formed by mixing a gel polymer forming monomer and a polymerization initiator, after forming an electrode assembly by using a porous nanofiber web as an electrolyte matrix, to then induce an addition polymerization reaction, and to thereby form a gel polymer electrolyte, to thus prevent a short circuit between a positive electrode and a negative electrode by the porous nanofiber web that maintains a web-like shape as it is to thereby promote stability and thinning simultaneously, and can be applied to a flexible secondary battery such as a lithium polymer battery using the polymer electrolyte.

What is claimed are:

1. A polymer electrolyte comprising:
    a separator including a porous nonwoven fabric as a support matrix and a pore-free polymer film layer formed on at least one surface of the porous nonwoven fabric, the pore-free polymer film layer being formed on entire surface of the at least one surface of the porous nonwoven fabric, wherein the porous nonwoven fabric is formed of a fiber, the fiber being formed of a core fiber made of PP (polypropylene) and a PE (polyethylene) coat on an outer periphery of the core fiber, the porous nonwoven fabric has a thickness of 10 μm to 40 μm and a porosity of 70% to 80%, and the pore-free polymer film layer has a thickness of 3 μm to 5 μm; and
    a gel polymer portion including a gel-type polymer impregnated in the porous nonwoven fabric of the separator,
    wherein the gel polymer portion is formed by a polymerization reaction of an electrolytic solution impregnated into the separator, the electrolytic solution comprising a gel polymer forming monomer, an organic solvent, a lithium salt, and a polymerization initiator,
    wherein the pore-free polymer film layer comprises a polymer that is swellable in the electrolytic solution and in which electrolyte ions are conductible in the electrolytic solution, and
    wherein the pore-free polymer film layer is formed by forming a porous nanofiber web on the at least one surface of the porous nonwoven fabric, and heating the porous nanofiber web at a temperature lower than a melting point of the porous nanofiber web, thereby converting the porous nanofiber web into the pore-free polymer film layer.

2. The polymer electrolyte according to claim 1, wherein the gel polymer forming monomer is MMA (methylmethacrylate), and the gel-type polymer is PMMA (polymethylmethacrylate).

3. The polymer electrolyte according to claim 1, wherein part of the gel polymer forming monomer is made to the gel-type polymer by the polymerization reaction, and is infiltrated into positive and negative electrodes disposed on both sides of the separator.

4. The polymer electrolyte according to claim 1, wherein the polymer is a CTFE (chlorotrifluoroethylene)-based PVdF co-polymer or a HFP (hexafluoropropylene)-based PVdF co-polymer.

5. A lithium secondary battery comprising:
    a positive electrode and a negative electrode that allow occlusion and release of lithium; and a polymer electrolyte disposed between the positive electrode and the negative electrode,
    wherein the polymer electrolyte comprises a polymer electrolyte according to claim 1.

6. The lithium secondary battery according to claim 5, wherein the gel polymer forming monomer is MMA (methylmethacrylate), and the gel-type polymer is PMMA (polymethylmethacrylate).

7. A lithium secondary battery comprising:
    an electrode assembly in which a plurality of unit positive electrode cells and a plurality of unit negative electrode cells are separated and are alternately stacked by using a pair of porous separators;
    a compression band for taping an outer circumference of the electrode assembly;
    a case in which the electrode assembly taped with the compression band is contained; and a polymer electrolyte disposed between each unit positive electrode cell and each unit negative electrode cell,
wherein the polymer electrolyte comprises a polymer electrolyte according to claim 1.

\* \* \* \* \*